J. A. BARNES.
Neck-Yoke Adjuster for Harness.
No. 223,575. Patented Jan. 13, 1880.
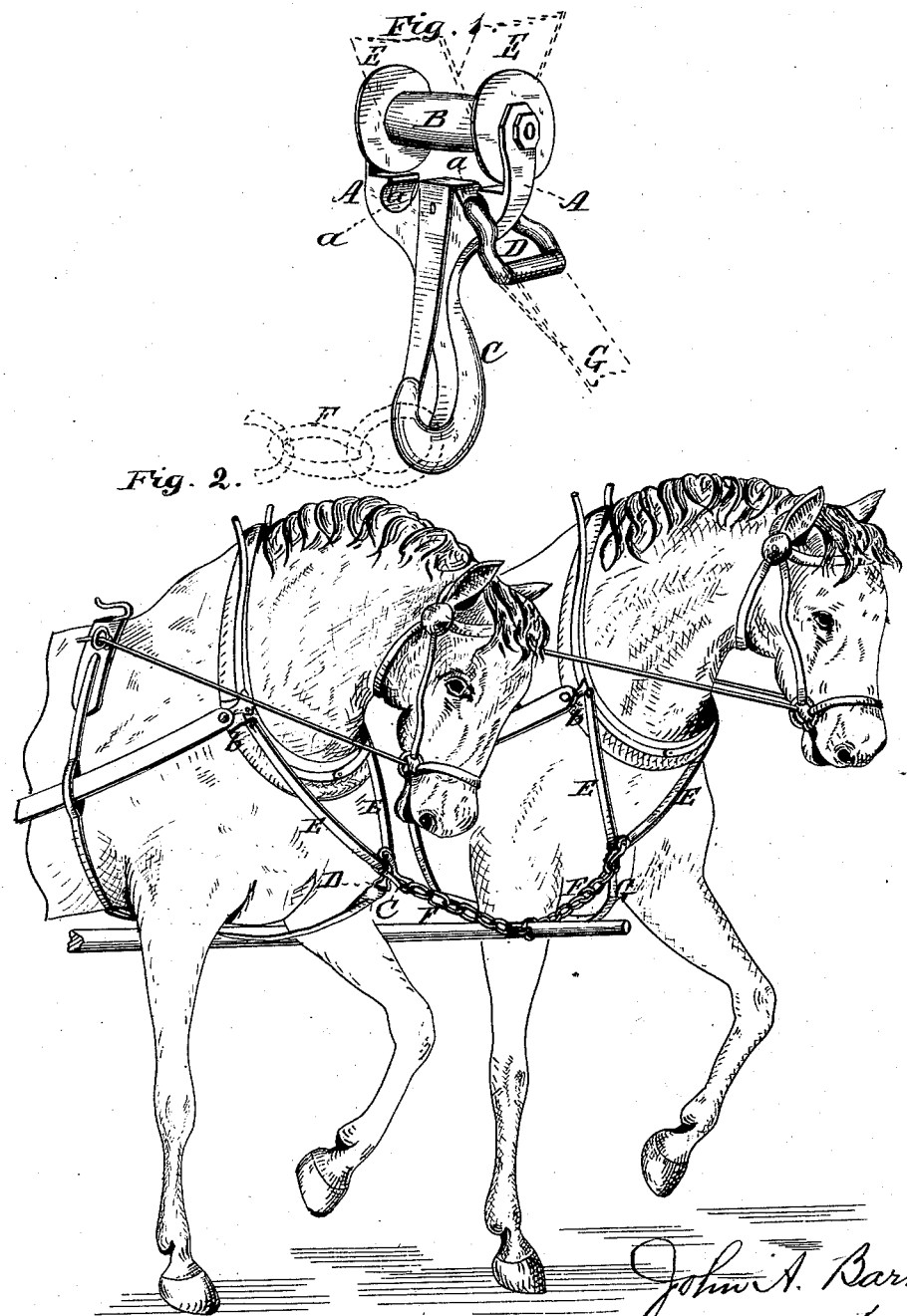

UNITED STATES PATENT OFFICE.

JOHN A. BARNES, OF LACLEDE, MISSOURI.

NECK-YOKE ADJUSTER FOR HARNESS.

SPECIFICATION forming part of Letters Patent No. 223,575, dated January 13, 1880.

Application filed November 25, 1879.

*To all whom it may concern:*

Be it known that I, JOHN ALPHEUS BARNES, of Laclede, in the county of Linn and State of Missouri, have invented certain new and useful Improvements in Neck-Yoke Adjusters for Harness, of which the following is a specification.

This invention relates to that class of harness devices the object of which is to prevent the jarring or jamming of the shoulders of draft-beasts, and is especially applicable to double teams.

The invention which I have made in this class consists of a frame combining a roller for a hame-connecting strap, a snap-hook for the yoke-chain of the tongue, and an eye for a connecting-strap with the belly-band; and the theory and practice of said device and its combination with said straps are that as the wagon-wheel strikes a rut or is otherwise jarred the said hame-connecting strap is traversed by the roller and the jar prevented, and also that the belly-band strap keeps the collar firmly to the shoulder during such action, thereby avoiding the jamming, bruising, and rubbing of the shoulder of the animal.

The device thus briefly described is attached to each animal, and the yoke-chains of the wagon-tongue connect with the snap-hooks depending from the breasts of the two animals.

In the accompanying drawings, Figure 1 represents a detail of the device itself independent of strap-connections, and Fig. 2 a perspective representing a double team of horses harnessed to a pole or tongue by means of my said invention.

The frame is preferably of metal, and may be said to be a U-shaped frame, A, in which a roller, B, has its bearings, as shown in the drawings. From the bottom or bend of this U-frame depends a snap-hook, C, while within the bend of the frame are socket or groove seats $a\ a$ for an eye, D, as shown. This eye may be put upon either side, as its position is only for the convenience of the teamster, as some teamsters hitch or snap hooks from the right side and some from the left.

The roller B traverses and is held by a strap, E, each end of which is attached to the hame rings or terrets $b\ b$, and the snap-hook connects with one of the yoke-chains F of the tongue or pole, it being understood that each draft-beast is provided with this frame and hame-connecting strap. The eye D connects with a strap, G, through the lower end of which the belly-band is passed.

The operation is as follows: When the wagon or any agricultural machine which has a tongue strikes a rut or meets an obstruction the tongue is thrown laterally, and heretofore this has jarred the horses considerably. By my device the roller traverses the strap with the movement of the tongue, and the collar is kept to the shoulder by the strap from the belly-band.

I claim—

1. As an improved article of manufacture, a neck-yoke adjuster consisting of the frame A, for double teams, provided with the roller B, the snap-hook C, and the eye D, all arranged substantially as and for the purpose set forth.

2. In a neck-yoke adjuster for double-team harness, the U-frame A, provided with roller B, snap-hook C, and eye D, in combination with hame-connecting strap E, belly-band strap G, and the yoke-chains F of a pole or tongue, substantially as and for the purpose set forth.

In testimony whereof I have hereunto set my hand.

JOHN ALPHEUS BARNES.

Witnesses:
H. T. STRICKLER,
W. J. PORTER.